March 31, 1959 F. FAULHABER 2,879,691
PHOTOELECTRIC EXPOSURE METER
Filed Oct. 23, 1956 3 Sheets-Sheet 1

INVENTOR
FRITZ FAULHABER
BY
ATTORNEYS

March 31, 1959  F. FAULHABER  2,879,691
PHOTOELECTRIC EXPOSURE METER
Filed Oct. 23, 1956  3 Sheets-Sheet 2

INVENTOR
FRITZ FAULHABER

BY Mocker Blum
ATTORNEYS

March 31, 1959  F. FAULHABER  2,879,691
PHOTOELECTRIC EXPOSURE METER
Filed Oct. 23, 1956  3 Sheets-Sheet 3
FIG. 6
| f: | 29 | 35 | 50 | 80 | 100 | 120 | 150 | 250 |
|---|---|---|---|---|---|---|---|---|
| 24×36 | 76° | 62° | 42° | 26° | 21° | 17° | 14° | 8° |
| 6×6cm |  |  | 74° | 44° | 35° | 29° | 23° | 14° |
| 6×9 |  |  |  | 68° | 54° | 44° | 35° | 21° |
| 9×12 |  |  |  | 97° | 74° | 60° | 47° | 28° |
| 13×18 |  |  |  |  |  | 98° | 74° | 42° |
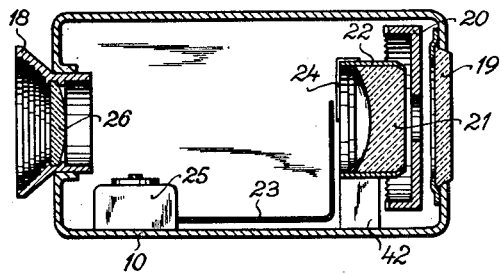
FIG. 7
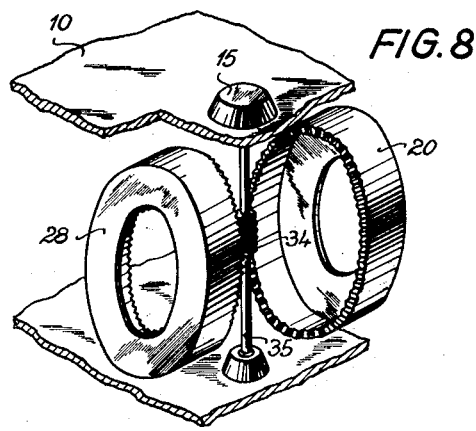
FIG. 8
INVENTOR
FRITZ FAULHABER
BY  Mock & Blum
ATTORNEYS

United States Patent Office 2,879,691
Patented Mar. 31, 1959

2,879,691

PHOTOELECTRIC EXPOSURE METER

Fritz Faulhaber, Schonaich, Germany, assignor to Voigtlander-Aktiengesellschaft, Braunschweig, Germany, a corporation of Germany Application October 23, 1956, Serial No. 617,800

Claims priority, application Germany October 27, 1955

13 Claims. (Cl. 88—23)

This invention relates to a photoelectric exposure meter and it has particular relation to a pocket exposure meter provided with a view finder.

It has been suggested previously to combine photocell pocket exposure meters with a direct vision view finder in order to form a light measuring unit for photographic purposes. Such devices have a fixed measuring angle, i.e., the solid angle of the measuring light incident in the photocell and the solid angle of the view finder—which is approximately equal to said light angle—are invariable and correspond in general to the solid angle of a normal photographic picture-taking objective. In the case of objects from which considerably differing light beams pass from the individual portions of the object to the photocell, exposure of the photographic negative material in conformity with the indicated average light value often results in unsatisfactory pictures, because in this type of light measuring the most important portions of the objects are not taken particularly into consideration, and are then over-exposed or under-exposed, respectively.

It has also been known to arrange in front of the light-sensitive cell of the exposure meter an optical system for the limitation of a predetermined light beam. These devices have the disadvantage that only one single predetermined light beam is available in the same. Moreover, the selection of the size of this light beam always represents a compromise which strongly affects the usefulness of such systems in practice. If the light beam is large so that the photoelectric cell receives much light through said optical focusing device in order to produce stronger measuring currents and higher sensitivity, the value of the focusing will become practically illusory as soon as the size of the solid angle of the picture-taking objective is approached. In such a case—in the same manner as in the case of conventional exposure meters not provided with the before mentioned optical device—integration over too large an object surface occurs during measuring. If, on the other hand, the solid angle, and thus the light beam, has a small value, the object of measuring the light of specific image portions only, can be attained provided that the space surrounding the object is relatively strongly illuminated and a defined measuring current is indicated. If, however, the lighting density is smaller, the light intensity of a light beam having a small angle will not be sufficient for a satisfactory indication in most cases. Therefore, the practical utility will be considerably limited.

In a known exposure meter provided with an optical focusing device in front of the photoelectric cell, in the light measuring procedure two comparative measurements are supposed to be carried out in sequence, with predetermined light cones of different sizes. These light cones are limited by two diaphragms which have different apertures and can be inserted into the measuring path of the light rays. In addition to the disadvantages which have already been mentioned above and occur in each of the two measurements, this method has the disadvantage that two measurements of the light with subsequent comparative evaluation of the measuring values by the photographer require too much time, particularly if snap-shots are to be made. This exposure meter is therefore almost impracticable in many cases.

The main object of the present invention is to avoid the disadvantages of the hitherto known exposure meter devices and to provide an exposure meter combined with a direct vision view finder, particularly a pocket or hand exposure meter by which in all practically occurring cases a satisfactory measurement of light for photographic purposes can be carried out. According to the invention, this is attained by arranging, in front of the photocell, an optical device which permits focusing of the measuring light cone at will and providing in the device for focusing as well as in the view finder an adjustable diaphragm in such a manner that these two diaphragms can be adjusted jointly only. Due to the adjustability of the solid angle, it is possible to obtain in the case of varying image sizes and objective focal lengths, adjustment to the most favorable conditions in light measuring. The above mentioned disadvantages of a too small sensitivity on the one hand, and of a too large measuring angle on the other hand, can be avoided in the present invention. It is of advantage to select the admission angle of the measuring instrument always smaller than the image angle of the objective. The difference between these two angles depends on the light conditions in the picture-taking space in the respective case and must be selected by the photographer. In the case of an illumination which is rich in contrast, or is very bright, it is advisable to measure the light originating from the most important motive of the image with a solid angle which is as small as possible. In the case of darker objects which are relatively uniformly illuminated over large areas, such as for example, in the case of many interior pictures, it is advisable to carry out the light measurement with a larger solid angle and thus obtain the advantage of a higher sensitivity of the measuring indication.

In carrying out the invention, as the light focusing device for the exposure meter, a converging lens or lens arrangement is applied, which forms an image in the plane of the adjustable diaphragm, i.e., in other words, the diaphragm is located in the focal plane of the lens or lens system. In order to distribute the measuring light always on the entire light sensitive surface of the photocell in the case of differently bundled light cones of the individual measurements, it is contemplated according to the present invention to arrange the diaphragm in front of the photocell at a distance corresponding to the focal length of the lens system. In this manner, even light coming from a portion of the object, which is limited by the smallest diaphragm aperture, can be distributed over the entire surface of the photocell.

In the device of the invention it is preferred to use an iris diaphragm, because this diaphragm can be adjusted continuously and therefore permits the inclusion of any desired part of the image. The adjusting mechanism can be of any conventional construction. In order to save space, it is of advantage to provide a common handle between the two diaphragm mounts in such a manner that the diaphragms can be similarly adjusted over only one intermediate member. This can be effected, for example, by a worm which is fixedly seated on the shaft of a rotatable button and is engaged by the adjusting toothings of the two diaphragms. Adjustments of the diaphragms must be carried out in such a manner that the light incidence angles for photocell and view finder, which are limited by the diaphragm apertures, are always equal to each other, i.e., the angle of the measuring light must always correspond to the section of the object which is included by the finder.

The exposure meter used in carrying out this invention can be provided with a photocell which supplies current in the manner used in conventional commercial exposure meters. However, in the use of such photocells, which do not need a battery, the measuring range is undesirably limited in the case of small lighting densities, even if no small light beams are used for measuring. According to the present invention, this disadvantage is very satisfactorily eliminated by using, instead of a photocell, a photoresistance cell. The latter is preferably arranged in a branch of a conventional electrical bridge connection, the indicating instrument of which can be adjusted to zero.

In the use of such a device, light intensities down to about 10 Lux can be measured with a light incidence angle which is smaller than the picture-taking angle of a normal photographic objective. Thus, the device provides for safe exposure measurements in the entire lighting range for photographic purposes. It will be appreciated that the safe possibility of measuring small lighting densities will become more and more important in the future also for the amateur, in view of the steadily increasing light sensitivity of newly developed photographic negative materials. It will be understood, however, that any other photocell connection can likewise be used, for example, an arrangement in which the battery current increasing upon decrease of the photocell resistance due to the incidence of light is directly measured and utilized for exposure measurements.

The appended drawings illustrate by way of example and without limitation some embodiments of and best ways for carrying out the invention.

Fig. 1 diagrammatically illustrates a wiring plan;

Fig. 6 illustrates a table of numerical data which can be applied to the bottom surface of the exposure meter;

Fig. 7 is a sectional view through the view finder and measuring instrument arrangement; and Fig. 8 diagrammatically illustrates on an enlarged scale some of the elements used in the device of the invention.

Figure 1:
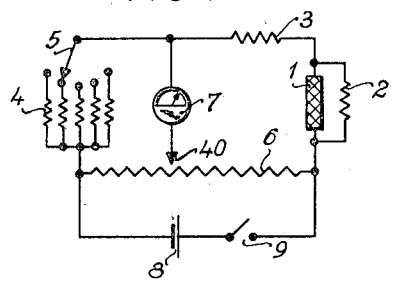

Referring now to the drawings in detail, in Fig. 1 reference symbol 1 denotes a photoresistance cell which can be adjusted and compensated for temperature in a manner known by itself by means of resistances 2 and 3. This cell is arranged in the right branch of a conventional bridge connection. The left branch of the bridge comprises a group 4 of electrical resistances, each of which can be connected into the current circuit by means of a rotary switch 5, so that a corresponding number of measuring ranges can be used. Switching of these resistances 4 is effected automatically according to the invention upon operation of the common adjusting means for the diaphragms in front of the photocell and the view finder, respectively. It has been found to be of advantage to provide the diaphragm adjusting means in certain intervals with rest or detent notches and to indicate—in a manner known by itself—in a window the solid angles passing through the diaphragm apertures in each of said rest positions. In this manner, the operator of the camera can check at any time the size of the incident light cone which is used in the respective measuring step. The photocell 1 and the standard resistances 4 are electrically connected to the bridge potentiometer 6. One of the wires of the indicating device 7, which operates as a balancing apparatus, is connected with slider 40. Upon closing switch 9, which may be a push button device, the bridge arrangement receives current from current source 8.

The arrangement shown in Fig. 1 operates as follows: Upon incidence of light in the photoresistance cell 1, the resistance of the latter is changed so that a current, which is proportional to the incident light, will flow. The standard resistances switched on over switch 5 will be in a certain proportion to the cell resistance which is affected by the incident light. By means of slider 40 on the potentiometer 6, instrument 7 can be brought to zero position by equalizing, and the amount of displacement of slider 40 can be used as the value for the light measurement.

Figure 2:
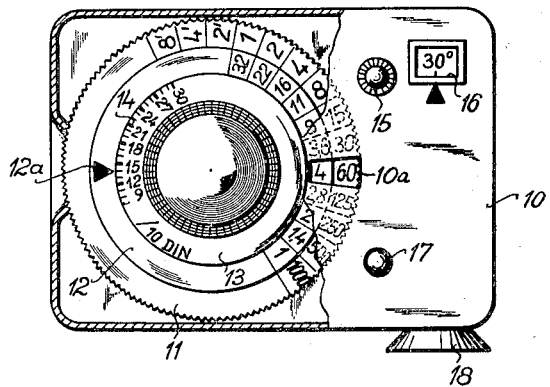
Figs. 2 and 3 illustrate an exposure meter according to the present invention in top view and back view, respectively.
Figure 3:
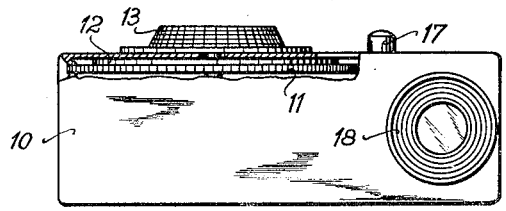

Figs. 2 and 3 illustrate an exposure meter viewed from above and from its backside. A handy casing 10 contains the elements indicated in Fig. 1, the finder and the light focusing means. In order to adjust the device 7 to zero, a rotary button 13 is provided and the measured exposure factors can be read on the annular discs 11 and 12. 11 denotes the ring carrying the time values and this ring is rotatable relative to the casing 10 with a notch provided at each time value. The position of this ring can be read in a stationary window 10a provided in the casing. On the lower side turned to the interior of the casing, the potentiometer winding 6 is fastened. The annular disc 12 represents the diaphragm ring which is connected with the rotary button 13 carrying the film sensitivity scale 14 in an adjustable manner and with the use of notches. By means of the rotary button 15, the measuring angle of the exposure meter can be modified by displacing the diaphragms 20 and 28 (see Fig. 4) and the adjusted value of said measuring angle can be read in window 16. The current switch denoted 9 in Fig. 1 is operated acocrding to Figs. 2 and 3 by a push button 17 which projects from the surface of the casing. On the backside of the casing, the view finder ocular 18 can be seen.

Figure 5:
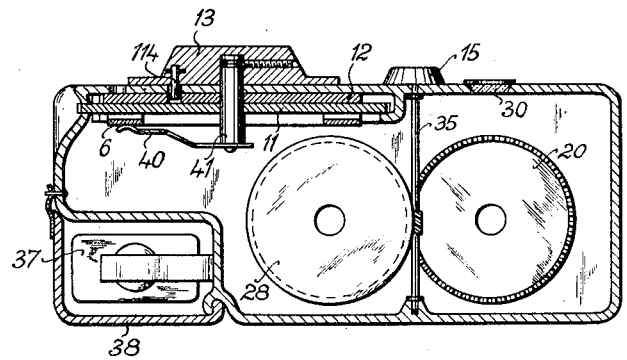
Fig. 5 illustrates the position of individual parts in the casing of the device.

Operation of the device is as follows: First, by turning button 15, the desired image angle is adjusted in window 16, i.e., the angle which corresponds to the picture-taking objective and is selected by the operator as most favorable for the camera objective used in dependence on the prevailing light conditions and on the motive to be photographed. This image angle can be varied, for example, between 5° and 60°. This change can be carried out in any desirable sequence of steps, for example, with the use of adjusting points and notches from 5 to 5 degrees. If the exposure meter does not indicate the correct film sensitivity, the button 13 has to be somewhat lifted and turned along its film sensitivity scale 14 until the mark 14 upon the mark 12a applied to ring 12 indicates the correct value. The lifting of button 13 in this adjusting step is necessary in the example here considered in order to lift the drop-in pin 774 in button 13 from a detent hole in annular disc 12 and place it in the detent hole corresponding to the sensitivity degree used in each case, as will be understood from Fig. 5. The operator will then look through the finder ocular 18, will direct the exposure meter to the object to be photographed, or to one of its most important portions, and will simultaneously press the button 17.

Upon looking through the view finder, in the finder image, or beside it, the pointer of the instrument will be seen. Fig. 7, which is a section through the view finder and measuring instrument arrangement, shows clearly the arrangement of a measuring instrument 25 with the pointer 23 and a stationary countermark 24. Behind the view finder cover window 19 in casing 10, the light focusing diaphragm 20 is located and behind the latter the finder lens 21 in mount 22 on a support 42. Opposite to this arrangement, ocular 18 containing ocular lens 26 is inserted in casing 10. When looking through the finder, pointer 23 will first not point to the mark 24. This is attained by turning button 13, whereby diaphragm ring 12 and slider 40 of potentiometer 6 are simultaneously displaced. If, finally, the pointer 23 stands opposite its zero mark 24, a definite relation, which is shown in window 10a, between exposure time and diaphragm is attained, said relation corresponding to the prevailing light conditions in the object space. If the photographer finds that the values for time and diaphragm indicated in window 10a are not satisfactory for the picture to be taken, he can turn the entire adjusting device, i. e., ring 11 with potentiometer 6 and button 13 with ring 12 and slider 40, until the desired combination of time and diaphragm appears in window 10a, by turning ring 11, for example, over a specific handle or by a specific recess in the casing. Prior to this, a coupling (not shown in the drawings) between time ring 11 and diaphragm ring 12 can be switched on.

If reading in the window 10a is not wanted, the adjusting device can be simplified by omission of time adjusting ring 11 and application of the time scale directly to the casing and mounting of the potentiometer 6 fixedly to the casing. After adjustment of the instrument pointer 23 to its zero mark 24, the time-diaphragm-combinations, which are satisfactory for the picture to be taken, can be read by oppositely arranged numerical values.

Figure 4:
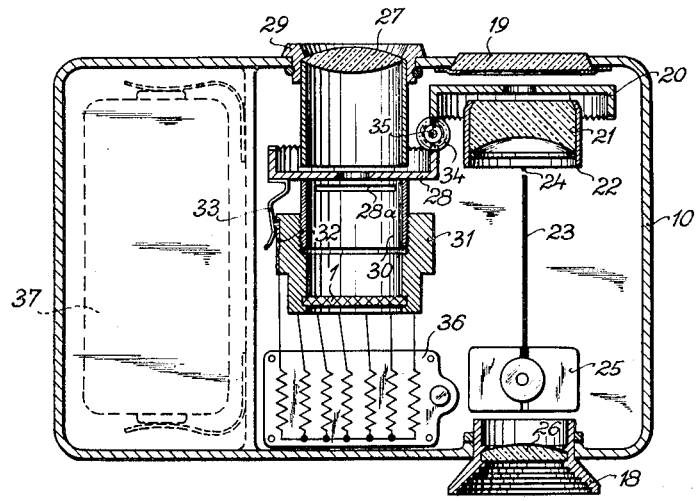
Fig. 4 illustrates a device according to the invention with the cover removed.

Fig. 4 illustrates the device with the cover removed. This figure shows the view finder arrangement consisting of a covering window 19, an adjustable diaphragm 20, an objective lens 21 arranged in mount 22, the ocular lens 26 and the ocular mount 18. The pointer 23 of the measuring instrument 25 stands in front of lens 21 in front of the zero mark 24 and said pointer 23 is bent in an angle. It will be appreciated that the view finder here shown can be constructed also in any other suitable manner and the optical means between ocular and objective lens can be arranged differently. Next to it, the light measuring arrangement consisting of lens 27, the iris diaphragm 28 and the photocell 1, is shown. The lens 27 is seated in mount 29 and it has the purpose of forming an image of the object to be photographed in the diaphragm plane of the iris diaphragm 28. The iris diaphragm is provided with a short pipe 30 which carries an insulating body 31 in which contacts 32 are arranged and these contacts form, together with the slider 33, which is fastened to the iris diaphragm, stepped switch 5 shown in Fig. 1. The light of the object sharply shown on the diaphragm 28 is distributed through the diaphragm opening and causes diffused lighting of cell 1. The diaphragm 28 and diaphragm 20, which is located in front of the finder, are both jointly adjusted, by the worm 34 (see Fig. 8), which is preferably effected stepwise. As shown in Fig. 8, the worm 34 is seated on shaft 35 which carries on its upper end the button 15 for adjustment of the selected measuring angle. In Fig. 8, all resistances which are shown in the wiring diagram according to Fig. 1, are combined on board 36. The battery 37 shown in dotted line is arranged in a particularly covered recess of casing 10 in such a manner that it is easily accessible and exchangeable from the outside. The arrangement of battery 37 can be clearly seen also in Fig. 5. The space for the battery is limited and closed by the easily removable cover 38. It will also be understood from Fig. 5 that the potentiometer 6, provided with slider 40 which is fixedly seated on shaft 41 of button 13, is connected with the time adjustment disc 11.

The bottom surface of the device may be provided with a table (shown in Fig. 6), in which the image angle of the more frequently used objectives is stated. Furthermore, the data of the coordinated focal lengths and image sizes are stated. This table should facilitate selection of the measuring angle to the operator of the camera. For example, for the focal length of 50 mm. and in the case of a small picture of 24 x 36, the normal image angle measured along the long side is found to be 42° according to the table. If, as assumed above, adjustment of the diaphragm by means of the handle 15 has notches at a distance of 5 to 5 degrees, in the case here assumed in measuring at defective illumination, the value of 40° will be adjusted in window 16.

In Fig. 4 closely behind the iris diaphragm 28, a slot 28a is shown in which from above, through the casing wall, other diaphragms or filters can be inserted. This opening or shaft 28a can be arranged also closely in front of the iris diaphragm 28, i. e., in deviation from the arrangement shown in the drawing. For example, according to the invention, in this shaft an aperture diaphragm can be inserted, the aperture of which corresponds to the smallest iris diaphragm opening which can be adjusted by turning the worm 34. In this manner, without the necessity of decreasing the iris diaphragm by turning, the extent of contrast in the picture-taking space can be measured by directing the exposure meter in sequence from a brightest section to a darkest image section, and comparing the measured light values with each other. In this manner, the photographer can quickly find out whether the negative material used by him is suitable for use in view of the extent of contrast in the image. Without the necessity of inserting a corresponding aperture diaphragm in front of the finder objective, the small sections of the object can be sighted through the finder by lengthening, for example, the countermark 24 of the pointer 23 shown in Fig. 7 up to the optical axis. By the insertion of a filter in shaft 28a, the filter factor can be taken into consideration in a simple manner in the exposure measurement.

The exposure meter according to the present invention can be used, due to the presence of shaft 28a, also for making measurements, in a manner known by itself, by filters inserted one after the other and color temperatures under unfavorable light conditions, because, due to the variable light focusing or light collecting of the measuring device, this exposure meter always permits to go to the lower limit of the sensitivity needed in each case. Instead of individually inserting filters in front of the light-admitting opening of the measuring instrument, a filter-slide can be applied which contains two or more filters suitable for measuring the color temperature. From the deflection obtained in the various positions of said slide, the color temperature can be calculated, whereby the general weakening of the measuring light by the filter must be of course compensated for by a corresponding adjustment of the sensitivity scale 14.

An additional advantage of the present invention consists in the following: By the possibility of effecting a very sharp focusing or collecting of the measuring light—at which, however, the necessary measuring sensitivity is still present—it is possible in the case of objects which are very rich in contrast to find out by means of two or more subsequent measurements, which refer to the darkest and brightest portions of the image, respectively, whether the film inserted in the respective case in the camera is satisfactory in view of the extent of contrast in the respective case. This is of particular importance if fine-grained films provided with thin layers are used or when color pictures of objects which are rich in contrast are contemplated.

It will be understood from the above that this invention is not limited to the steps, designs, constructions and other details specifically described above, and illustrated in the drawings and can be carried out with various modifications without departing from the scope of the invention as defined in the appended claims.

What is claimed is:

1. A photoelectric exposure meter containing a casing and a photo-cell and being combined with a view finder, said exposure meter comprising an optical device having lens means at its entrance opening for continuously variable collecting of the measuring light for the exposure meter, said device being arranged in front of the photo-cell; a first and a second continuously variable diaphragm, which are adjustable jointly only, said first diaphragm being located in the path of rays of said device for variable collecting of the measuring light, in front of the photo-cell behind said lens means, and said second diaphragm being located in the path of rays of the view finder between the view finder cover window and the finder lens.

2. A photoelectric exposure meter containing a casing and a photo-cell and being combined with a view finder, said exposure meter comprising an optical device for continuously variable collecting of the measuring light for the exposure meter, said device being arranged in front of the photo-cell; a first and a second continuously variable diaphragm, which are adjustable jointly only; said first diaphragm being located in the path of rays of said device for variable collecting of the measuring light, in front of the photo-cell, and said second diaphragm being located in the path of rays of the view finder between the view finder cover window and the finder lens, said optical device for collecting said measuring light consisting of lens means which forms images in the plane of said first diaphragm, this diaphragm being arranged at a distance substantially corresponding to the focal length of said lens means, in front of the photocell.

3. A photoelectric exposure meter as claimed in claim 2, in which said first as well as said second diaphragm are iris diaphragms.

4. A photoelectric exposure meter as claimed in claim 3, in which means are provided for uniformly adjusting the two iris diaphragms by a common operating handle over transmission members in order to change the two solid light incidence angles for the photocell and view finder always by equal amounts and to impart equal solid angles to the photocell and to the view finder.

5. A photoelectric exposure meter as claimed in claim 2, in which a photoresistance cell is used.

6. A photoelectric exposure meter as claimed in claim 2, comprising an electrical bridge connection in which a photocell is arranged in one branch of the bridge and the indicating instrument is adjusted to zero in the measuring procedure over a slide contact of a potentiometer.

7. A photoelectric exposure meter as claimed in claim 6, in which the measuring bridge contains several switchable standard resistances which correspond to individual measuring ranges.

8. A photoelectric exposure meter as claimed in claim 7, comprising means for automatically switching the standard resistances during joint adjustment of the first and second diaphragm upon change of the measuring angle from one measuring range to another.

9. A photoelectric exposure meter as claimed in claim 8, in which the device for adjusting the diaphragms is provided at predetermined intervals with detent points and means are provided for indicating in a camera window the size of the solid angle passing through the diaphragm openings at each detent point.

10. A photoelectric exposure meter as claimed in claim 9, in which the potentiometer for balancing to zero is firmly connected with an exposure meter part carrying a time scale, and the potentiometer slide is firmly connected with the part carrying the diaphragm scale.

11. A photoelectric exposure meter as claimed in claim 2, comprising a pointer for the measuring instrument and an adjustable mark coordinated therewith, said pointer and mark being visibly arranged in the view finder.

12. A photoelectric exposure meter as claimed in claim 2, in which the casing is provided with a table of numerical data for facilitating selection of the correct measuring angle.

13. A photoelectric exposure meter as claimed in claim 2, comprising means for the insertion of additional diaphragms and filters near the iris diaphragm of the exposure meter.

References Cited in the file of this patent
UNITED STATES PATENTS

| Number | Name | Date |
|---|---|---|
| Re. 21,210 | Riszdorfer | Sept. 19, 1939 |
| 1,990,361 | Bailey | Feb. 5, 1935 |
| 2,013,363 | Riszdorfer | Sept. 3, 1935 |
| 2,142,647 | Sauer et al. | Jan. 3, 1939 |
| 2,143,500 | Smethurst et al. | Jan. 10, 1939 |
| 2,250,898 | Tonnies | July 29, 1941 |
| 2,343,206 | Rath | Feb. 29, 1944 |
| 2,765,703 | Ward | Oct. 9, 1956 |